June 2, 1925. 1,539,867
H. C. RIDLER
COOLING DEVICE FOR DRINKING FOUNTAINS
Filed Aug. 12, 1922 2 Sheets-Sheet 1

Inventor
Harry C. Ridler
By his Attorneys

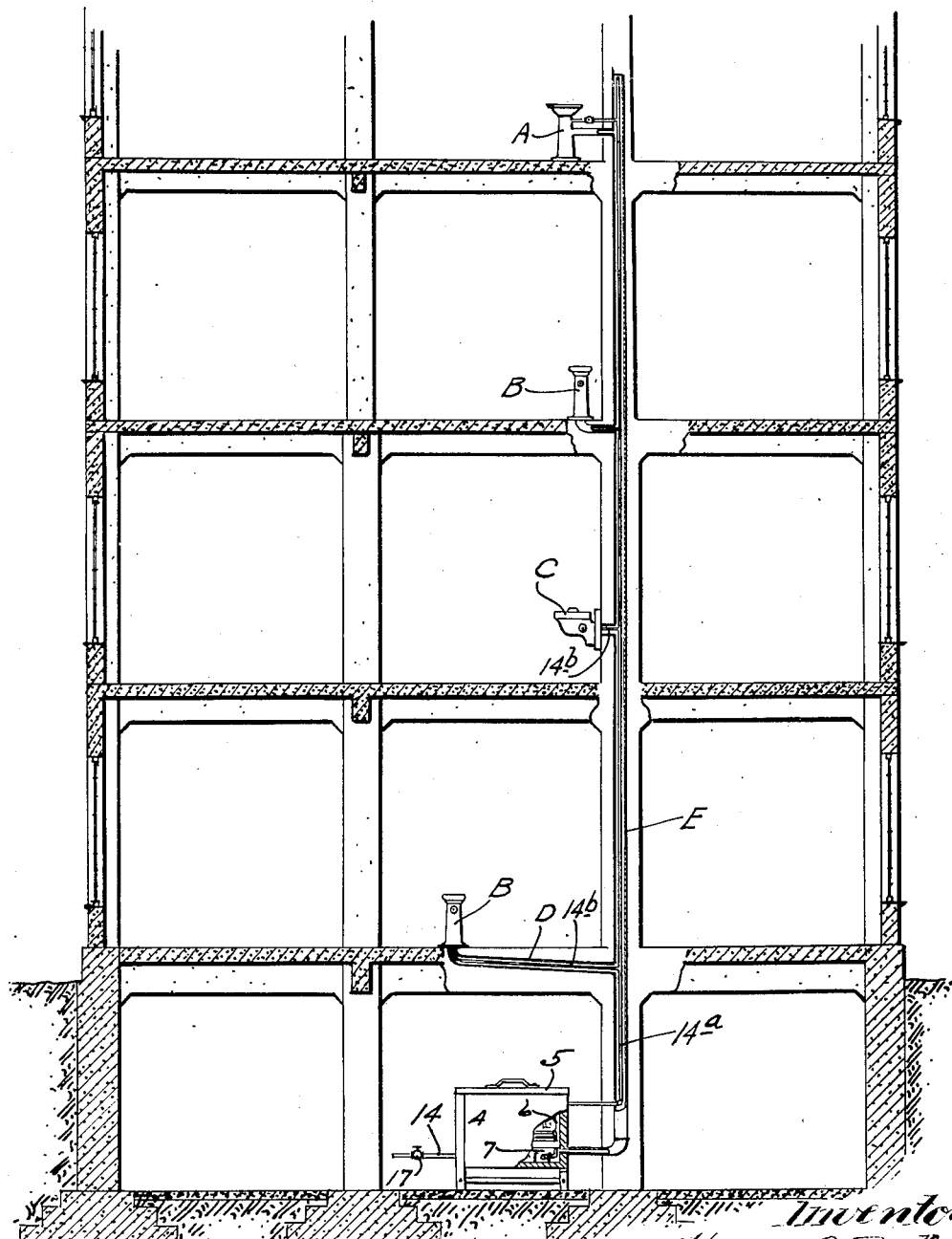

Patented June 2, 1925.

1,539,867

UNITED STATES PATENT OFFICE.

HARRY C. RIDLER, OF MINNEAPOLIS, MINNESOTA.

COOLING DEVICE FOR DRINKING FOUNTAINS.

Application filed August 12, 1922. Serial No. 581,543. REISSUED

*To all whom it may concern:*

Be it known that I, HARRY C. RIDLER, a citizen of the United States, residing at Minneapolis, in the county of Hennepin and State of Minnesota, have invented certain new and useful Improvements in Cooling Devices for Drinking Fountains; and I do hereby declare the following to be a full, clear, and exact description of the invention, such as will enable others skilled in the art to which it appertains to make and use the same.

My invention relates to drinking fountains of the type employing ice boxes or refrigerators for the cooling of the water, and generally stated, the invention consists of the novel construction and combinations and arrangement of parts hereinafter described and defined in the claims.

It is a known fact that every time a person drinks from a bubbling fountain four or five times as much ice cold water is discharged as waste as is consumed by the drinker. This waste of cold water represents a very large waste of temperature units and causes a consumption of ice far beyond the maximum amount that would be required if such waste could be eliminated.

My invention eliminates this waste of temperature units by a provision whereby the cold waste water running from the bubbling fountain is caught and confined, and the drinking water to be cooled is given its primary reduction in temperature by the cold waste water thus intercepted.

More specifically described, I provide, in connection with the customary ice box or primary refrigerator, a secondary refrigerator into which the waste cold water from the fountain is caused to flow. The pipe or tube that delivers the drinking water to the fountain head is passed first through the secondary refrigerator or waste cold water receptacle and then is passed through the main refrigerator or ice box.

One commercial embodiment of my invention is illustrated in the accompanying drawings wherein like characters indicate like parts throughout the several views.

Referring to the drawings:

Fig. 3 is a vertical section showing the invention incorporated in a scheme for supplying a plurality of fountains through a common cooling device.

Figure 1:
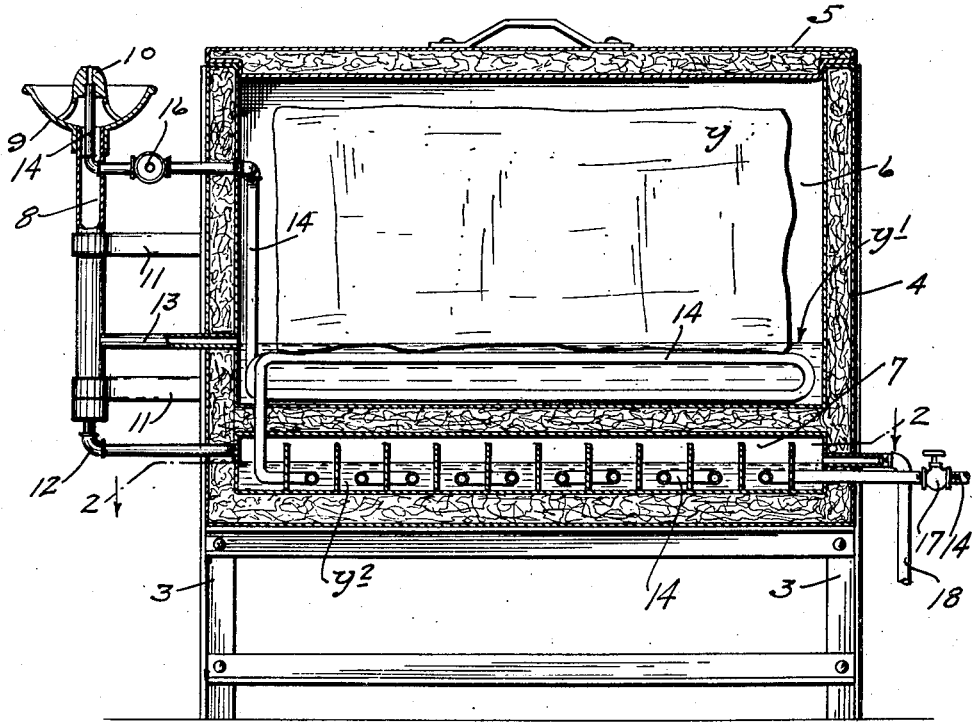
Fig. 1 is a vertical section taken through the complete device approximately on the line 1—1 of Fig. 2.

The numeral 3 indicates direct angular framework which supports insulated rectangular casing 4 provided with insulated cover 5 and divided into upper and lower refrigerator compartments 6 and 7. The compartment 6 is the primary or main or ice compartment adapted to contain a cake of ice $y$ and a predetermined amount of ice water $y^1$. The bubbling fountain comprises a tubular stem 8 with a bowl 9 and nozzle 10 of the usual or any suitable construction. The stem 8 is shown as supported from the casing 4 by brackets 11, and at its lower end is connected by a pipe 12 to the upper portion of the secondary compartment 7. The numeral 13 indicates an overflow pipe that extends from the water level of the primary or main compartment 6 and is tapped into one side of the tubular stem 8.

The drinking water will be supplied to the nozzle 10 through a metallic pipe or tube 14 that leads from a suitable source of water supply, such for instance as a city water pipe. This water pipe 14 is extended through the cold water $y^2$ contained in the secondary compartment 7, and it is preferably bent horizontally back and forth to form a plurality of U-shaped folds. The compartment 7 is provided with upright baffle plates or flanges 15 interposed between the U-shaped folds of said water pipe. From the compartment 7 the water pipe 14 is extended upward into the primary or main ice compartment 6, and below the water level thereof is bent back and forth to give a long pipe section to be submerged in ice water and which incidentally will serve to support the ice. Said pipe 14 is then extended upward and outward through one wall of the casing 4, thence into the upper portion of the tubular stem 8 and at its upper end is attached to the nozzle 10. Adjacent to the fountain, the water pipe 14 is provided with the customary normally closed hand-operated valve 16. Said water pipe 14 is also shown as provided with a normally open cut-off valve 17 just outside of the place where it enters the compartment 7. The numeral 18 indicates an overflow pipe that extends from the water level of compartment 7.

With the above arrangement, it is evident that the waste ice water that runs from the fountain head each time a person drinks therefrom will be directed into the compartment 7 and there contained for a certain period of time. Also it is important to note that the surplus ice water flowing from the main ice compartment 6 through tube 13 will be directed into said compartment 7. These two sources of cold water, usually wasted, are here caught and caged and caused to very greatly reduce the temperature of the drinking water as it passes through the compartment 7 on its way to the main ice compartment. Thus the water delivered into the compartment 6 on its way through the pipe 14 will reach said compartment 6 in a very cold condition, and hence a relatively small amount of ice will be consumed in further reducing its temperature to the ultimate low temperature more or less closely approximating that of ice water.

In actual practice, I have found that by this improved system of water cooling a very remarkable saving in the use of ice in connection with drinking fountains may be effected.

It will, of course, be understood that the drawings of this application illustrate but one of the many possible forms or arrangement that may be made within the scope of my invention.

It may be further noted that the flow of the surplus cold water from the ice compartment 6 and of the waste cold water from the fountain is downward and toward the overflow pipe 18 while the flow of the drinking water from the pipe 14 is in a reverse direction, to wit: upward through the two compartments 6 and 7 toward the fountain head. The extent of the secondary cooling compartment 7 may be made such that under ordinary conditions the exhaust water from the compartment 7 will be approximately at the temperature of the incoming drinking water, but this, of course, may be varied at will. In any event the cooling of the drinking water is progressively accomplished as it flows toward the main ice compartment and is further reduced in flowing through the ice compartment approximately to the temperature of the ice water. Obviously, all the cooling that is done in the secondary compartment effects the saving of the ice in the main compartment.

Figure 2:
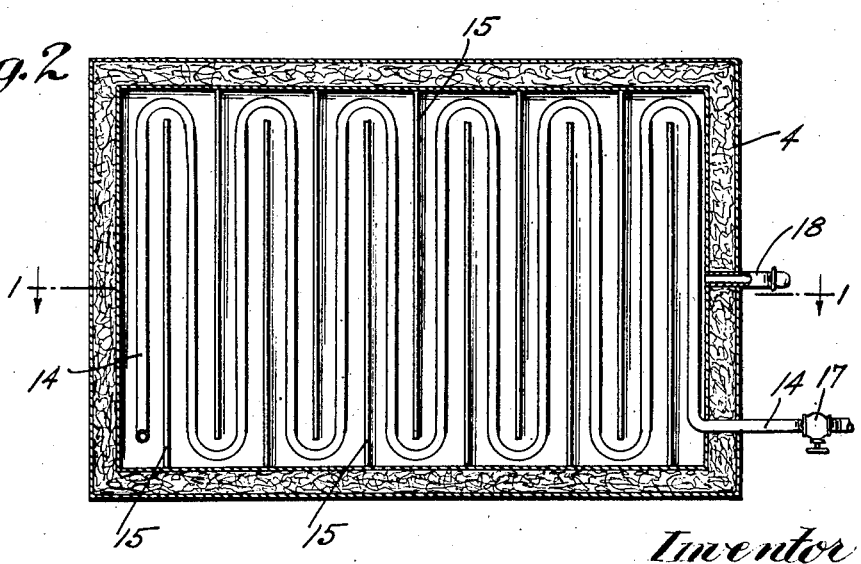
Fig. 2 is a horizontal section taken approximately on the line 2—2 of Fig. 1.

In the arrangement illustrated in Fig. 3, I have shown a scheme especially adapted for use in office buildings, hotels, and other public buildings where a plurality of fountains are supplied with water cooled from a relatively large common cooler or refrigerator. The cooler or refrigerator here employed may be the same as that illustrated in Figs. 1 and 2 except that it will be larger, hence, the corresponding parts thereof are indicated by the same characters that are employed in Figs. 1 and 2.

In this modified construction, several different types of bubbling fountains are indicated as entireties by the characters A, B, and C. In this arrangement the cold water overflow from the cold water waste pipes from the several fountains are connected by branch pipes D to a common upright cold water waste pipe E, the lower end of which is connected to a secondary cooling compartment 7 of the refrigerator in substantially the same manner that the pipe 12 is connected thereto in Figs. 1 and 2. The drinking water supply pipe 14 is extended through the compartments 7 and 6 of the refrigerator in the same manner as previously described, but is provided with a long upright extension 14ª that is extended concentrically through the common upright cold water return pipe E and has branch pipes 14ᵇ that extend through the branch cold water pipes D to the nozzles of the respective fountains.

In this arrangement the cold waste water from the several fountains, as it runs through the main pipe E and its branches, has a cooling effect on the drinking water and prevents the temperature thereof from rising while it is being delivered from the refrigerator to the fountains. This is so whether or not the pipe E is insulated. For further economy's sake in the use of ice, said pipe E would preferably be provided with a surrounding insulation. This insulation may be provided in different ways. In the arrangement illustrated, the pipe system is embedded in the concrete of the building. Such construction would be practical only when the drinking water system is installed at the time the building is erected. When installed after the building has been erected, the pipe E would be extended through the floors adjacent a wall or column, and in that case would be provided with a covering of asbestos or other suitable insulating material.

What I claim is:

1. The combination with a drinking nozzle, of primary and secondary refrigerating compartments, both constructed to contain low temperature water, said two compartments each having its own overflow passage opening therefrom at a point above its bottom and below its top, said primary compartment being located above said secondary compartment and the overflow passage of said primary compartment being connected to discharge into said secondary compartment, and a drinking water supply conduit connected to said drinking nozzle and extended through water contained in said primary and secondary compartments.

2. The combination with a drinking nozzle, of primary and secondary refrigerating compartments, both constructed to contain low temperature water, said two compartments each having its own overflow passage opening therefrom at a point above its bottom and below its top, said primary compartment being located above said secondary compartment and the overflow passage of said primary compartment being connected to discharge into said secondary compartment, and a drinking water supply conduit connected to said drinking nozzle and extended through water contained in said primary and secondary compartments, said drinking water supply conduit being arranged for delivery of drinking water to said nozzle, by a flow in a direction reverse to the direction of flow of the cold waste water through said secondary compartment.

3. The combination with a drinking fountain, of primary and secondary refrigerating compartments both constructed to contain low temperature water, and a drinking water supply conduit extended through said primary and secondary compartments and having portions that are submerged in the water contained in the said two refrigerating compartments, the said two refrigerating compartments being connected by an overflow pipe that leads from said primary compartment at a point above the bottom thereof, the overflow pipe just noted being located near one end of said secondary compartment and said compartment near its other end having a discharge overflow pipe, the said drinking water supply pipe being arranged for delivery of drinking water to said fountain by a flow in a direction reverse to the flow of the cold waste water through said secondary compartment.

4. The combination with a drinking fountain, of primary and secondary refrigerating compartments both constructed to contain low temperature water, a drinking water supply conduit extended through said primary and secondary compartments and having portions that are submerged in the water contained in the said two refrigerating compartments, the said two refrigerating compartments being connected by an overflow pipe that leads from said primary compartment at a point above the bottom thereof, and a waste cold water conduit extending from said fountain and arranged to cause the waste cold water to flow through said secondary compartment.

5. The structure defined in claim 3 in further combination with a waste cold water conduit extending from said fountain and arranged to cause the waste cold water to flow through said secondary compartment.

6. The combination with a refrigerator, of a plurality of drinking fountains, a cold water return pipe having branches connecting the same to the overflows of the several fountains, and a drinking water supply pipe extended through said refrigerator and through said common cold water return pipe and having branches that extend through the branches of said common return pipe and connected to the several fountains.

7. The structure defined in claim 6 in which said refrigerator has primary and secondary refrigerating compartments and said common return pipe is connected to said second refrigerating compartment, which latter has an overflow pipe.

8. The combination with a drinking nozzle, of primary and secondary refrigerating compartments, both constructed to contain low temperature water, said two compartments each having its overflow passage opening therefrom at a point above its bottom and below its top, said primary compartment being located above said secondary compartment and the overflow passage of said primary compartment being connected to discharge into said secondary compartment, a drinking water supply conduit connected to said drinking nozzle and extended through water contained in said primary and secondary compartments, and a waste water drain pipe extending from said nozzle and delivering into said lower or secondary compartment.

9. The combination with a drinking nozzle, of primary and secondary refrigerating compartments, both constructed to contain low temperature water, said two compartments each having its own overflow passage opening therefrom at a point above its bottom and below its top, said primary compartment being located above said secondary compartment and the overflow passage of said primary compartment being connected to discharge into said secondary compartment, and a drinking water supply conduit connected to said drinking nozzle and extended through water contained in said primary and secondary compartments, that portion of said drinking water supply conduit that is within said primary or upper compartment being closer to said drinking nozzle than is that portion of said conduit that is within the secondary or lower compartment.

In testimony whereof I affix my signature.

HARRY C. RIDLER.